US009596556B2

(12) United States Patent
Bhalla

(10) Patent No.: US 9,596,556 B2
(45) Date of Patent: Mar. 14, 2017

(54) METHODS AND APPARATUS FOR DETERMINING ADDRESS OF A MACHINE TYPE COMMUNICATION DEVICE IN A WIRELESS NETWORK

(75) Inventor: Rajesh Bhalla, Gahanna, OH (US)

(73) Assignee: ZTE Corporation, Shenzhen (CN)

( * ) Notice: Subject to any disclaimer, the term of this patent is extended or adjusted under 35 U.S.C. 154(b) by 154 days.

(21) Appl. No.: 14/111,746

(22) PCT Filed: Apr. 16, 2012

(86) PCT No.: PCT/US2012/033840
§ 371 (c)(1),
(2), (4) Date: Apr. 14, 2014

(87) PCT Pub. No.: WO2012/142618
PCT Pub. Date: Oct. 18, 2012

(65) Prior Publication Data
US 2014/0286237 A1    Sep. 25, 2014

Related U.S. Application Data

(60) Provisional application No. 61/535,343, filed on Sep. 15, 2011, provisional application No. 61/475,647, filed on Apr. 14, 2011.

(30) Foreign Application Priority Data

May 10, 2011  (WO) ................ PCT/CN2011/073896

(51) Int. Cl.
*H04W 4/00*  (2009.01)
*H04W 48/14*  (2009.01)

(52) U.S. Cl.
CPC ............ *H04W 4/005* (2013.01); *H04W 48/14* (2013.01)

(58) Field of Classification Search
CPC ............................. H04W 4/005; H04W 48/14
See application file for complete search history.

(56) References Cited

U.S. PATENT DOCUMENTS

2007/0165579 A1    7/2007 Delibie et al.
2007/0189311 A1 *  8/2007 Kim .................. H04L 29/12009
                                                                370/401

(Continued)

FOREIGN PATENT DOCUMENTS

EP    1003315 A2    5/2000
EP    2 309 702 A1  4/2011

(Continued)

OTHER PUBLICATIONS

ZTE, "MTC device addressing with STUN," Revision of S2-111373, Apr. 12, 2011 as listed in IDS filed on May 25, 2016, 3GPP.*

(Continued)

*Primary Examiner* — Jae Y Lee
(74) *Attorney, Agent, or Firm* — Perkins Coie LLP

(57) ABSTRACT

Techniques, systems and apparatus are described for implementing a framework for an address determination technique for IPv4 addressing of MTC devices behind NATs in wireless networks. In one aspect, a method includes determining address for machine type communications (MTC) devices behind Network Address Translators (NATs) in a wireless communication network. The determining includes assigning a private address to an MTC device attached to the wireless communication network, and determining mapped public transport address.

21 Claims, 16 Drawing Sheets

(56) References Cited

U.S. PATENT DOCUMENTS

2009/0097477 A1* 4/2009 Zhu .................... H04L 12/2861
370/352
2011/0021142 A1 1/2011 Desai et al.
2011/0053619 A1 3/2011 Shaheen et al.

FOREIGN PATENT DOCUMENTS

| JP | 2000-138696 A | 5/2000 |
| JP | 2009-534981 A | 9/2009 |
| WO | 2007/123359 A2 | 11/2007 |
| WO | 2009/063093 A2 | 5/2009 |

OTHER PUBLICATIONS

3GPP TSG SA WG2 Meeting #84, "Device Trigger Solution via PCRF," TD S2-111370, Bratislava, Slovakia, pp. 1-4, Apr. 2011.
European Search Report mailed on Mar. 16, 2015 for European Application No. 12770579.6, filed Apr. 16, 2012 (4 pages).
International Search Report and Written Opinion mailed on Oct. 12, 2012 for International Application No. PCT/US2012/033840, filed Apr. 16, 2012 (7 pages).
3GPP TSG SA WG2 Meeting #84, "MTC device addressing with STUN," TD S2-111954, Bratislava, Slovakia, pp. 1-5, Apr. 2011.
3GPP TSG SA WG2 Meeting #84, "Solution for MTC Device Addressing," TD S2-111373, Bratislava, Slovakia, pp. 1-4, Apr. 2011.
South Korean Office Action mailed on Apr. 26, 2016 for Korean Application No. 10-2013-7030036, filed Apr. 16, 2012 (14 pages).
3GPP TSG SA WG2 Meeting #84, "MT communications address and reachability resolution via DT-GW," TD S2-111439, Bratislava, Slovakia, pp. 1-10, Apr. 2011.
Japanese Office Action mailed on Jul. 29, 2016 for Japanese Application no. 2014-505410, filed Apr. 16, 2012 (9 pages).

* cited by examiner

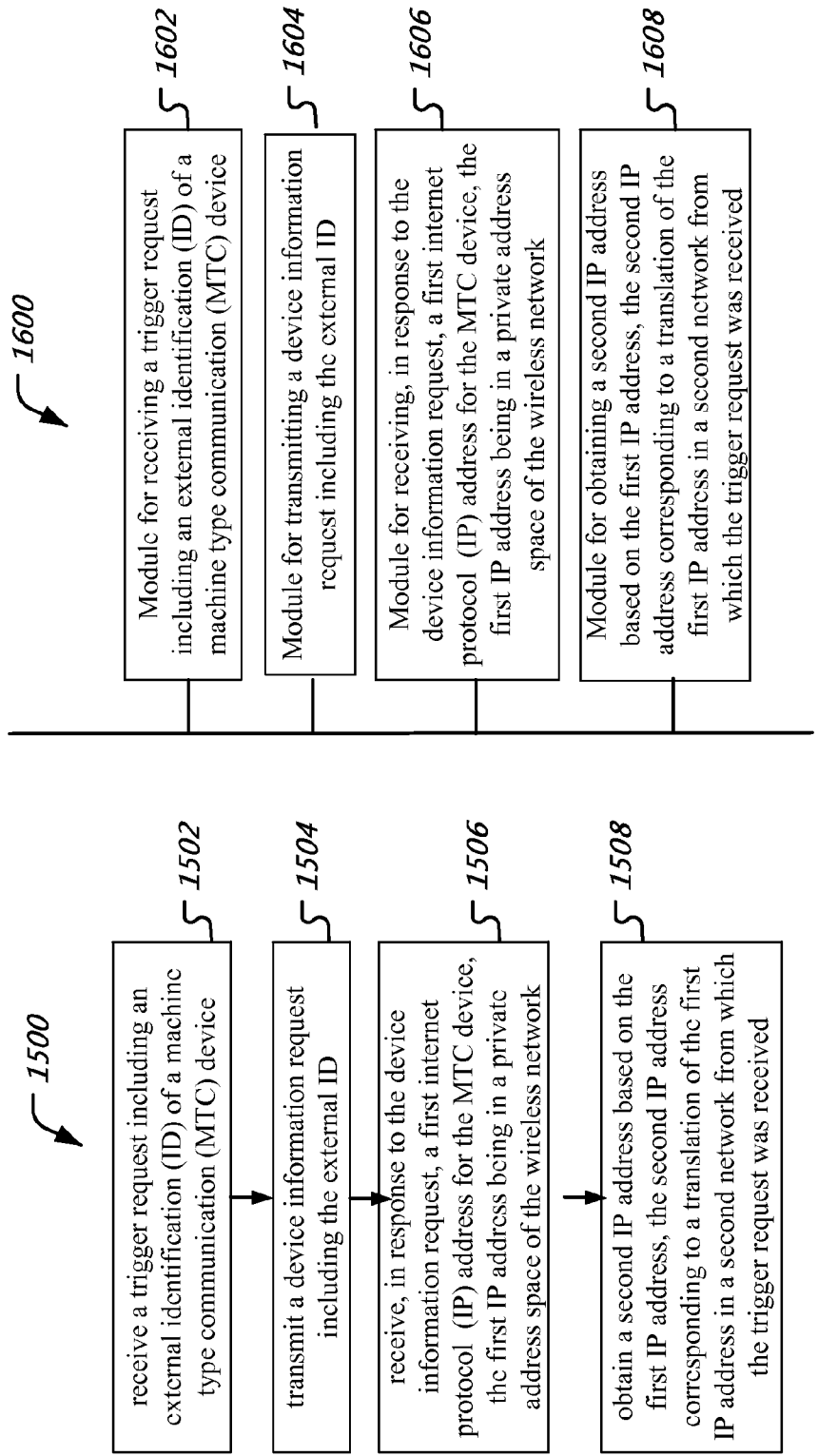

METHODS AND APPARATUS FOR DETERMINING ADDRESS OF A MACHINE TYPE COMMUNICATION DEVICE IN A WIRELESS NETWORK

CROSS-REFERENCE TO RELATED APPLICATIONS

This patent document claims the benefit of priority of U.S. Provisional Application No. 61/475,647, filed on Apr. 14, 2011, U.S. Provisional Patent Application No. 61/535,343, filed on Sep. 15, 2011, and International Patent Application No. PCT/CN2011/073896, filed on May 10, 2011. The entirety of these patent applications are incorporated by reference in the present patent document.

BACKGROUND

This patent document relates to communications, including machine type communications (MTC) and machine to machine (M2M) communications.

In many applications, wireless devices operating in a wireless network communicate with other devices and servers that are not operating in the wireless network but can be communicatively reachable. Various standards are available to provide such connectivity to wireless devices. For example, the Internet Protocol (IP) is one such framework by which a wireless device can be communicatively coupled with other devices, based on an IP address assigned to the wireless devices.

Certain operational cases, such as in systems that include machine type communications (MTC) and machine to machine (M2M) communications wireless devices, may lack the framework for IP connectivity.

SUMMARY

Techniques, systems and apparatus are described for implementing a framework for address determination techniques for IP addressing of MTC devices. In some implementations, IPv4 addresses may be used such that an MTC device may operate in a different IPv4 address space behind a NAT than the IPv4 address space in which a server that may want to communicate with the MTC device.

In one aspect, a disclosed method, implementable at a gateway device in a wireless communications network, includes receiving a request to perform translation of a first Internet Protocol (IP) address of a machine type communication (MTC) device that is in a first IP address space private to the wireless communication system, obtaining a second IP address for the MTC device, the second IP address being in a second IP address space different from the first IP address space, transmitting a response to the request by including the second IP address and facilitating user data plane communication to and from the MTC device and another communication entity in the second IP address space.

In another aspect, a disclosed method, implementable at a network-side in a wireless communication network, comprises receiving a trigger request including an external identification (ID) of a machine type communication (MTC) device, transmitting a device information request including the external ID, receiving, in response to the device information request, a first internet protocol (IP) address for the MTC device, the first IP address being in a private address space of the wireless network, and obtaining a second IP address based on the first IP address, the second IP address corresponding to a translation of the first IP address in a second network from which the trigger request was received.

These, and other features, are described in greater detail below.

BRIEF DESCRIPTION OF DRAWINGS

FIG. 15 is a flow chart representation of a process implementable at a network-side in a wireless communication network.

FIG. 16 is a block diagram representation of an apparatus for facilitating wireless communications.

DETAILED DESCRIPTION

This patent document discloses techniques, devices and systems that can be used, in some implementations, to determine address of a machine type communication (MTC) device in a wireless communications network. In some configurations, the disclosed techniques may be used to enhance the functionality of an existing inter-working function that is implemented at a hardware platform on the network-side in a wireless communications network. In some configurations, the disclosed techniques may be used to enhance the functionality of a gateway device (e.g., a packet gateway device P-GW) in a wireless communications network.

Figure 1:
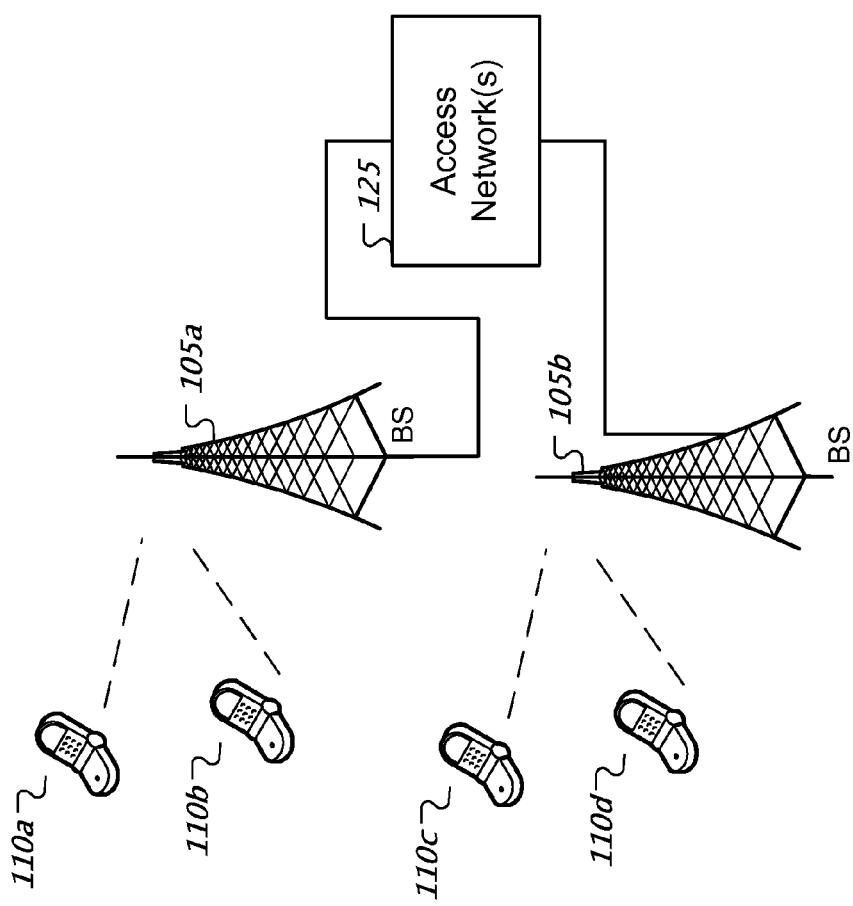
FIG. 1 is a block diagram representation of a wireless communications network.

FIG. 1 shows an example of a wireless communication system. A wireless communication system can include one or more base stations (BSs) 105a, 105b, one or more wireless devices 110 and an access network 125. Base station 105a, 105b can provide wireless service to wireless devices 110 in one or more wireless sectors. In some implementations, a base station (e.g., 105a or 105b) includes directional antennas to produce two or more directional beams to provide wireless coverage in different sectors.

The access network 125 can communicate with one or more base stations 105a, 105b. In some implementations, the access network 125 includes one or more base stations 105a, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110. A first base station 105a can provide wireless service based on a first radio access technology, whereas a second base station 105a can provide wireless service based on a second radio access technology. The base stations 105a may be co-located or may be separately installed in the field according to the deployment scenario. The access network 125 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO). For CDMA200 systems, the core network 125 can include, among others, mobile switching center (MSC), Packet Data Serving Node (PDSN) and others.

Figure 2:
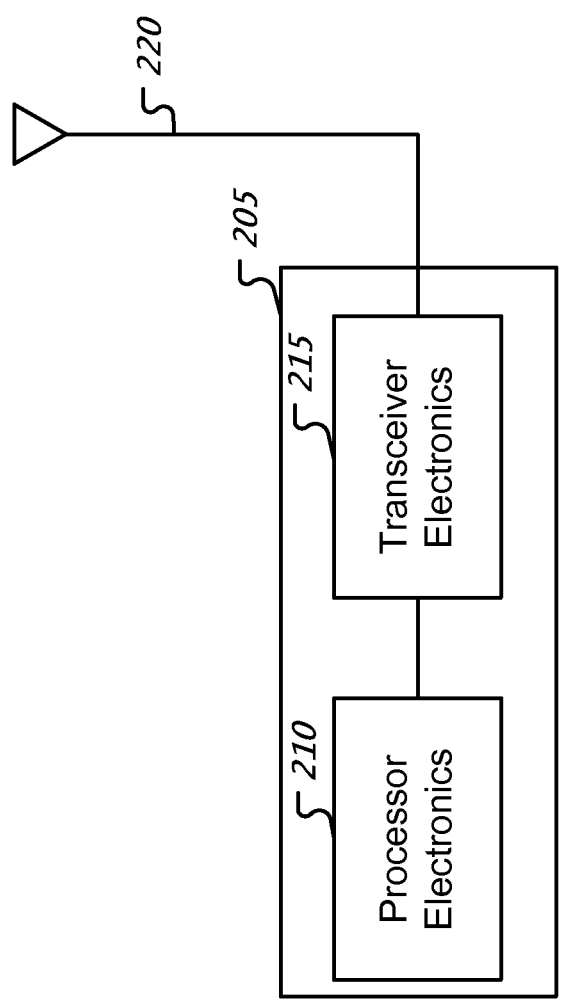
FIG. 2 is a block diagram of a wireless device operable in a wireless communications network.

FIG. 2 is a block diagram representation of a portion of a radio station 205. A radio station 205 such as a base station or a wireless device can include processor electronics 210 such as a microprocessor that implements one or more of the wireless communications techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

Techniques, devices and system described in this document can be used to, among other application, provide an Unilateral Self Address Fixing (UNSAF) framework for IPv4 addressing of MTC devices behind NATs in wireless networks. In addition, the techniques, devices and systems described in this document can be used to, among other application, enable an MTC device and/or an MTC server to determine public routable address of an MTC device deployed behind one or more Network Address Translators (NATs).

In the description below, section headings are used only to facilitate the understanding of the disclosed subject matter and do not limit the scope of the claimed subject matter in any way.

UNSAF Framework for IPv4 Addressing of MTC Devices Behind NATs in Wireless Networks Communicating endpoints that are separated by one or more NATs do not typically know how to refer to themselves using addresses that are valid in the addressing realms of their peers. For many purposes, the endpoints need to know the addresses (and/or ports) by which they are known to their peers.

This problem is sometimes known as UNilateral Self-Address Fixing (UNSAF). As stated in RFC3424, UNSAF is the process whereby an entity behind the NAT attempts to determine or fix the address (and port) by which it is known in the 'public' domain (outside the NAT). This 'public' address can then be used in protocol exchanges for addressing the entity behind the NAT, or be advertised as a 'public' address from which the entity behind the NAT can receive communications.

For UNSAF, two cases need to be considered. In the first case, when the entity behind the NAT initiates communications, and in the second case, when an entity on the outside of the NAT needs to initiate communications.

2. UNSAF for Wireless Networks

Due to the limitation on the availability of public IPv4 addresses, MTC device(s) may be deployed behind NAT(s) and assigned private non-routable IPv4 address (and thus not reachable by the MTC Server(s)). Depending on the nature of the MTC applications, there could be a need either for the MTC device or for the MTC server to be the initiator of the communications. For some applications an MTC device behind the NAT needs to know its publicly routable transport address before initiating communications with a peer-entity. Initiation of communications from outside the wireless network (such as from the MTC server for device triggering) will require the outside entity to know the publicly routable transport address of the MTC device.

As used in this document, a transport address is the combination of an IP Address and Port Number (such as a UDP or TCP port number and therefore address resolution may imply resolving both the IP address and the associated port number.

With such requirements for MTC communications, address determination techniques for IPv4 addressing for MTC devices behind NATs for wireless networks are useful. Such address determination technique should be able to support the two scenarios below:

1. MTC device behind the NAT, where the MTC device or the client initiates communications, and
2. MTC server outside of the NAT and the server needs to initiate communications (e.g., for device triggering).

Figure 3:
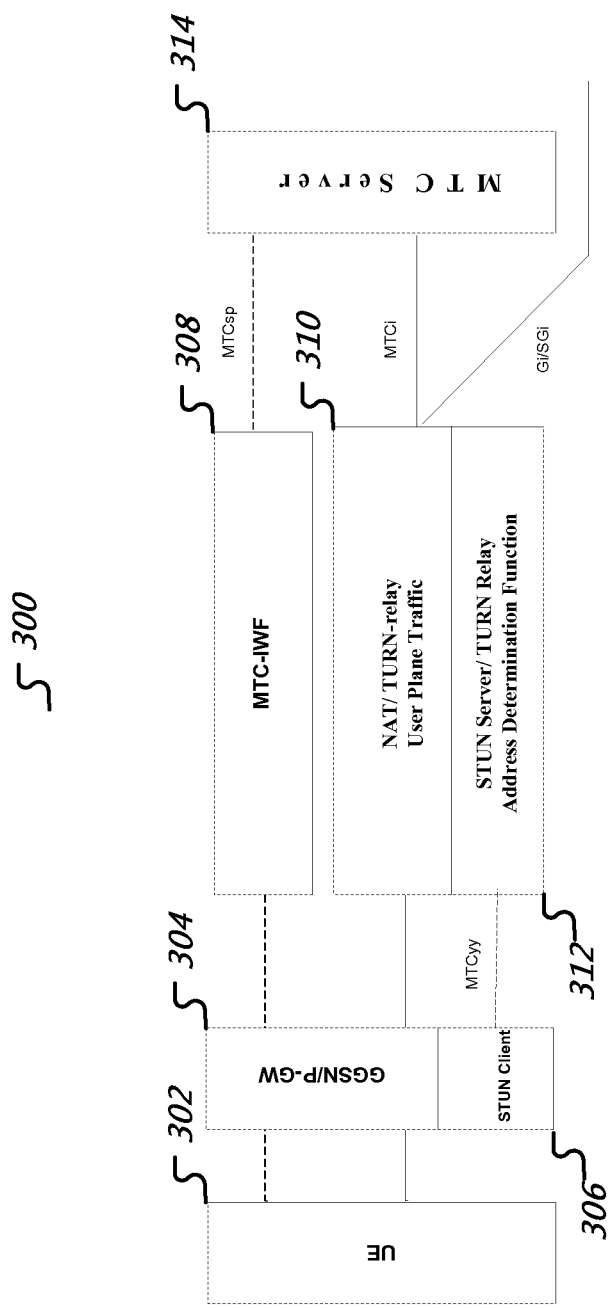
FIG. 3 is a block diagram representation of a Network Address Translation system.

This document describes an exemplary framework for address determination techniques for IPv4 addressing of MTC devices behind NATs in 3GPP networks. Depending on the nature of the NATs, Endpoint-Independent-Mapping (EIM) and Endpoint-Dependent-Mapping (non-EIM) NAT, two solutions are disclosed. For NATs with EIM behaviour, address determination technique based on Session Traversal Utilities for NAT (STUN) protocol (IETF RFC5389) is proposed. For NATs with non-EIM behaviour, address determination technique based on Traversal Using Relays around NAT (TURN) protocol (IETF RFC5766) may be utilized.
Suitable Architecture:

Example reference architecture for NAT Traversal using Non-Managed NAT for MTC services for 3GPP networks is illustrated in FIG. 3. Similar reference model is applicable for other wireless networks by replacing the GGSN/P-GW entity with an appropriate network entity for the other wireless network. For example, for 3GPP2 networks the GGSN/P-GW entity is substituted with the PDSN in the illustrated reference model.

In the illustrated address translation system 300, IP address translations and address bindings in the NAT 310 are not controlled by the wireless network. Such IP address translations and address bindings are created by the use of session specific signaling when the MTC Server 314 wants to initiate communications with the MTC device (located at UE 302) used for Machine type communications. The Machine Type Communication InterWorking Function (MTC-IWF) 308 may be coupled between the MTC server 314 and the GGSN/P-GW 304.

In this example reference model illustration for 3GPP networks, the NAT device 306 is behind the GGSN/P-GW 304 in the operator domain and only user plane traffic traverses the NAT. GGSN stands for Gateway General Packet Radio Service Support Node. The NAT device 306 could be a standalone functional entity or integrated with the GGSN/P-GW 304. Address determination function in the NAT conforms to the protocol defined in RFC5389 (STUN) or RFC5766 (TURN) depending on the type of the NAT. For EIM type of NAT, user plane traffic 310 flows directly between the GGSN/P-GW 304 and the NAT. For non-EIM type of NAT, the user plane traffic flows between the GGSN/P-GW 304 and the TURN relay function 312. RFC5128 describes the EIM and non-EIM type NATs. The STUN function in the GGSN/P-GW 304 may be limited to the STUN/TURN client functions.

Figure 4:
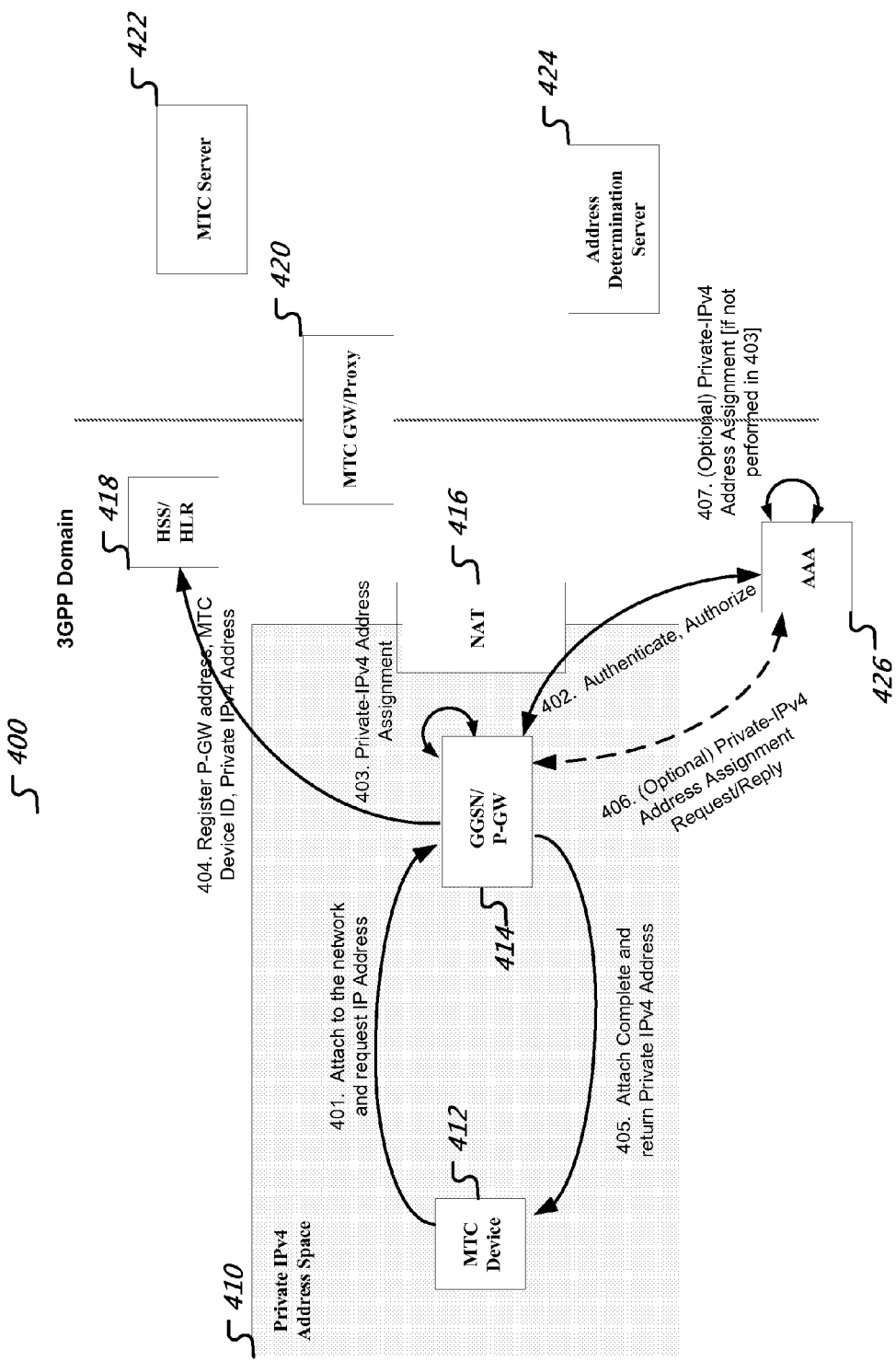
FIG. 4 depicts signals exchanged for facilitating private IPv4 address assignment.

3. Address Determination Techniques for IPv4 Addressing of MTC Devices Behind NATs in Wireless Networks
3.1 Framework The address determination technique described in this paper comprises of two steps:

MTC device attaches to the wireless network and a private IPv4 address is assigned to the device
Determination of the mapped public transport address FIG. 4 is an exemplary illustration of an architecture 400 of private IPv4 address assignment and address registration procedures for 3GPP networks. An MTC device 412 behind a NAT 416 attaches (message 401) to the 3GPP network (domain) and requests establishment of a packet data protocol (PDP) context/packet data network (PDN) connection and IP address assignment. For 3GPP2 networks, for illustrative purposes, the MTC devices 412 behind the NAT 416 attaches to the 3GPP2 network and requests establishment of the link layer (PPP) connection with the PDSN and the assignment of the IP address. Similar steps in other wireless networks are also possible.

The MTC device 412 is authenticated and authorized (message 402) with the AAA 426. A PDP context/PDN connection is established and a private-IPv4 Address is assigned (message 406) to the MTC device. Depending on the operator policy, the IP address may be assigned by the AAA 426 or by the GGSN/P-GW 414. Details of the AAA authentication and authorization procedures and IP address assignment procedures are as per the call setup procedures for the appropriate wireless technology. In this example illustration, the GGSN/P-GW 414 registers MTC device 412 specific information such as the GGSN/P-GW address, MTC device ID, assigned private IPv4 address information etc. with the HSS/AAA 418, 426. Alternatively the GGSN/P-GW may register all or part of such MTC device specific information with the MTC Gateway/Proxy (such alternate procedure is not shown in FIG. 4).

As regards the determination of the mapped public transport address, two scenarios need to be considered.

1. MTC device behind the NAT (client) initiates communications, and
2. MTC server outside of the NAT (server) needs to initiate communications (e.g., for device triggering).

Figure 7:
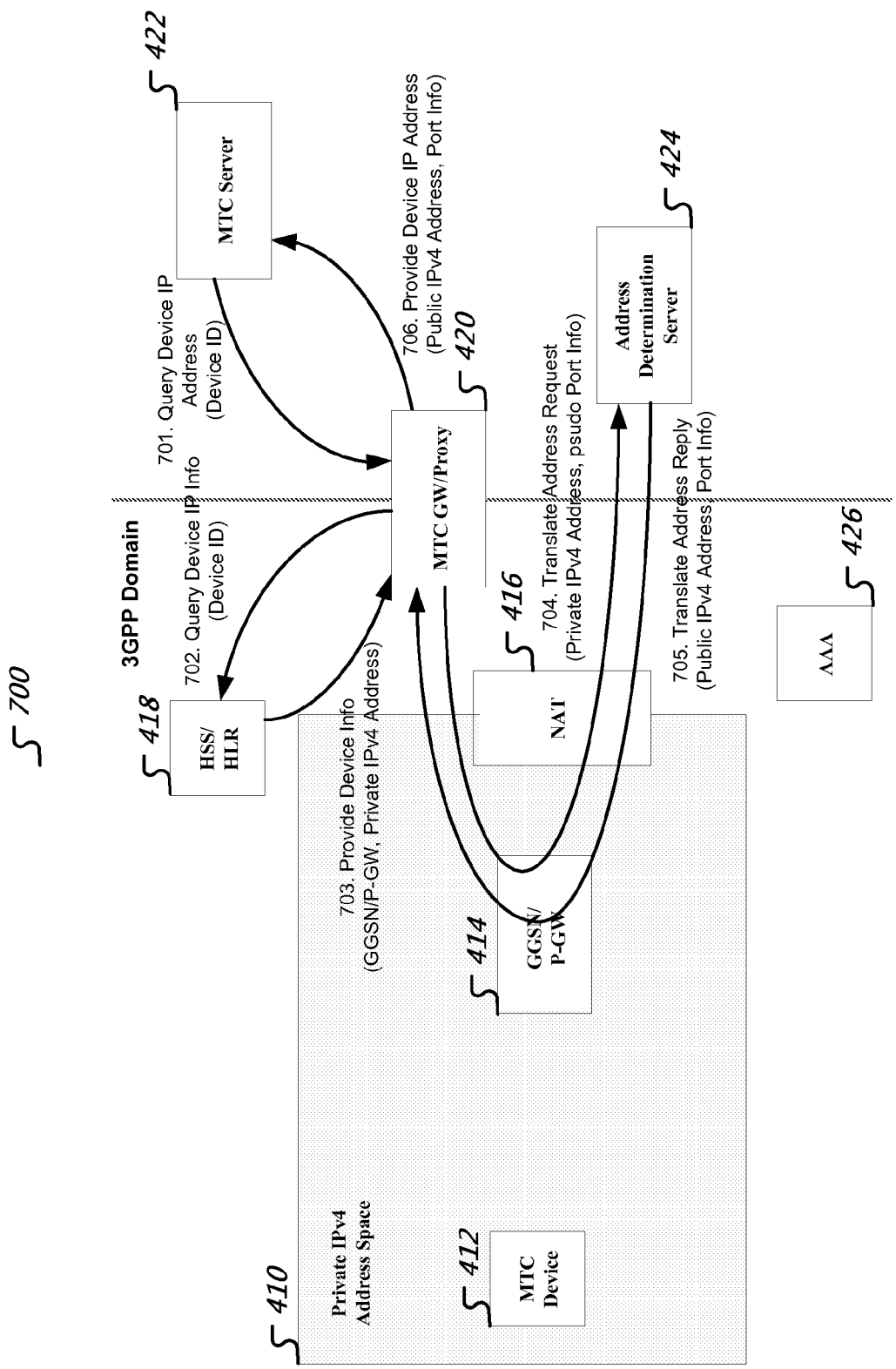
FIG. 7 is a block diagram representation of messages exchanged during an IPv4 address translation for device triggering.

Scenario-2 is considered first, and is illustrated in FIG. 7. When the MTC server 422 wants to initiate communications with an MTC device 412, if it already does not have the (public) transport address information for the MTC device 412, the MTC server 422 queries the transport address of the MTC device by sending a Query message 701 to the MTC Gateway/Proxy 420. The Query message 701 includes the MTC device ID. MTC Gateway/Proxy 420 queries the HSS/HLR 418 for the serving GGSN/P-GW 414 information and the private IPv4 address assigned to the MTC device, or obtains such information from its local cache if so available. On the receipt of the private IPv4 address assigned to the MTC device, the MTC Gateway/Proxy initiates Translate Address Request/Reply procedure (704, 705) by passing the assigned private IPv4 Address and pseudo Port information to the GGSN/PGW 414, which in turn performs such procedure with the Address Determination Server 424. The 'port' chosen for the Translate Address Request 704 procedure could be a dynamic/private (ephemeral port) in the range of 48 k to 64 k or some other port. Alternatively, instead of the MTC Gateway/Proxy 420 choosing the pseudo Port, such port could be chosen by the GGSN/P-GW 414. The Address Determination Server 424 performs address translation and returns the mapped public transport address (public IP Address+Port) information 705 to the GGSN/P-GW 414. Such information, in turn, is passed to the MTC Gateway/Proxy and the MTC server (706). MTC server 420 can now use such public transport address to initiate communications with the MTC device 412. The MTC device 412 (which may be assigned IP address in the private space of the wireless network 410) may be online or offline to receive such communications from the MTC server 420.

Figure 11:
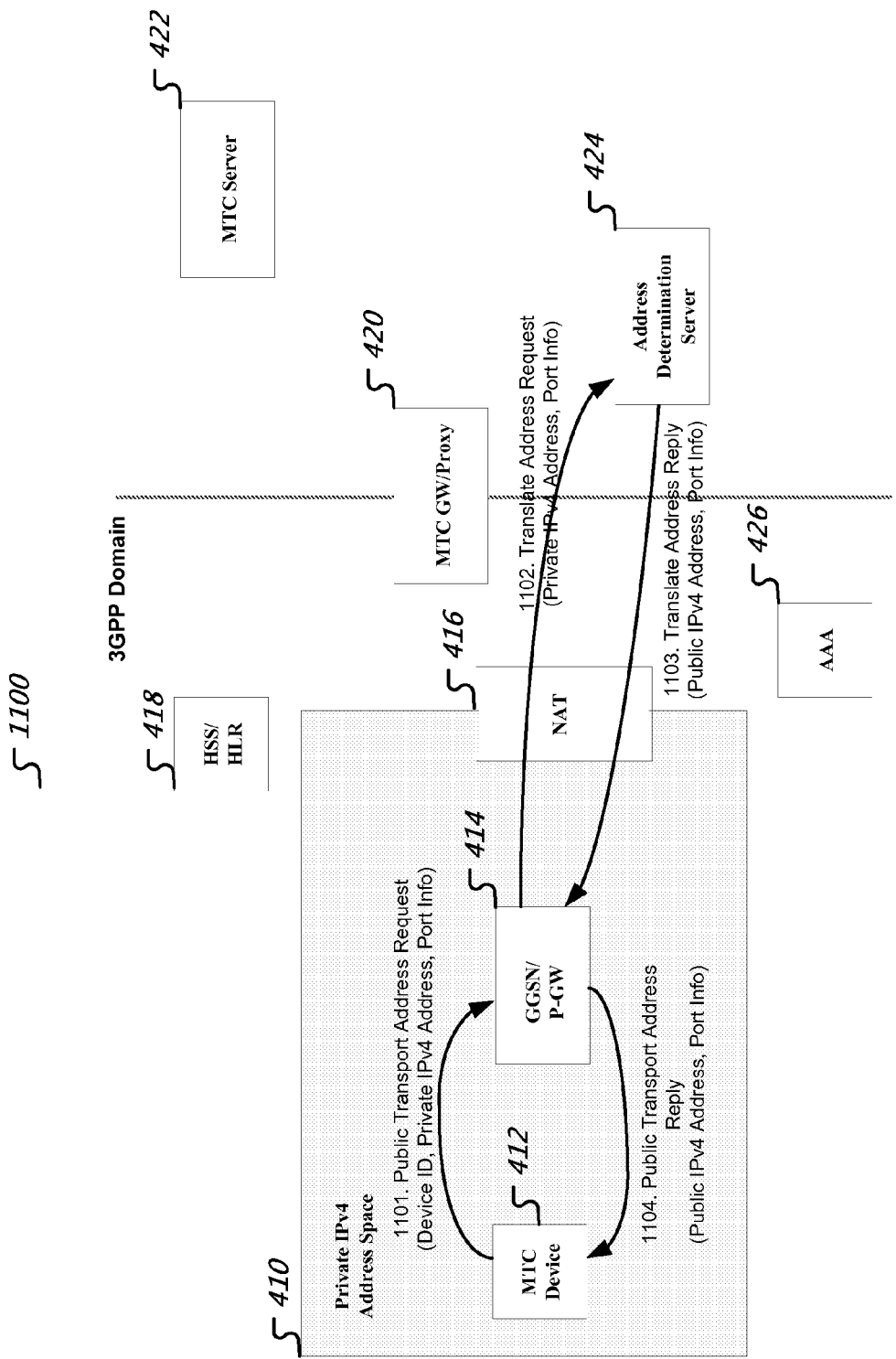
FIG. 11 is a block diagram representation of transport address translation for MTC device initiated communication (option 1).
Figure 12:
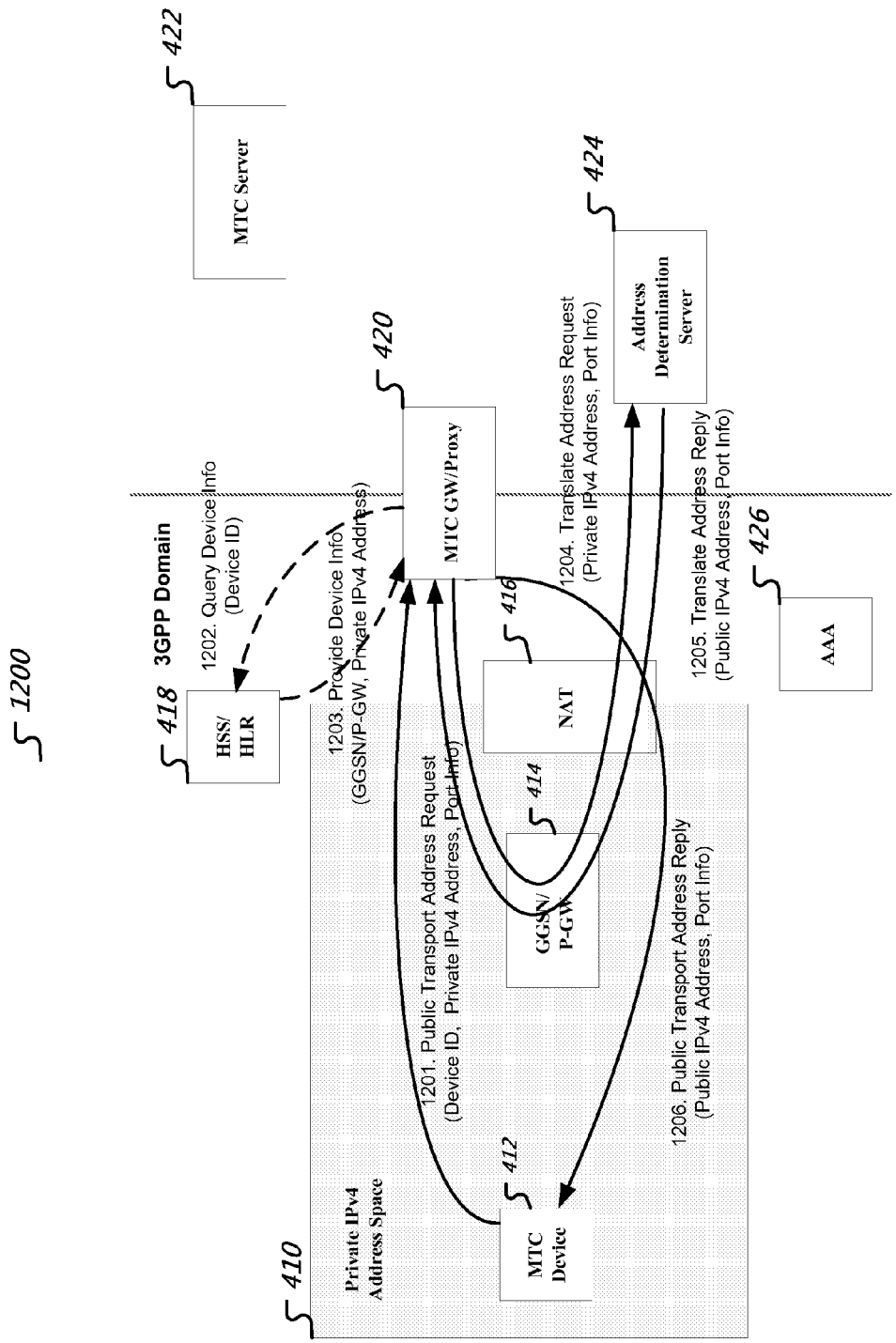
FIG. 12 is a block diagram representation of transport address translation for MTC device initiated communication (option 2)

As regards scenario-1 (MTC device behind NAT initiates communications), two procedures are illustrated in FIG. 11 and FIG. 12 respectively. For some applications an MTC device behind the NAT needs to know its routable transport address before initiating communications with a peer-entity. The MTC device 412 initiates Public Transport Address Request/Reply (1101, 1104) procedure by sending Device ID and the assigned private IPv4 address information to an entity (e.g., GGSN/P-GW 414, MTC Gateway/Proxy 420) in the 3GPP network. Such Public Transport Address determination procedure may be performed with the help of entities such as the GGSN/P-GW (Option 1) or the MTC Gateway/Proxy (Option 2).

For Option 1, the Public Transport Address Request/Reply procedure (1101, 1104) is performed with the help of entities such as the GGSN/PGW 414. When the MTC device 412 wants to initiate communications with a peer entity, and if it does not already have its (public) transport address information, depending on the application at the MTC device 412, the MTC device 412 selects the 'port' from which it wants to initiate communications with the peer entity. It then initiates Public Transport Address Request/Reply procedure (1101, 1104) by sending the Request message 1101 directed to the GGSN/P-GW 414. The Request message 1101 includes information such as the Device ID, the private IPv4 Address (assigned to the MTC device) and the 'port' information (chosen by the MTC device). Alternatively, if the IPv4 Address is not included in the Request message 1101, such information can be obtained by the GGSN/P-GW 414 by querying the HSS/HLR 418 based in the Device ID, or obtained from the local cache at the GGSN/P-GW 414 if so available. The GGSN/P-GW 414 then initiates Translate Address Request/Reply procedure (1102, 1103) by passing the assigned private transport address (IPv4 Address and the Port) information to the Address Determination Server 424. The Address Determination Server 424 performs address translation and returns (1103) the mapped public transport address (IP Address+Port) information to the GGSN/P-GW 414, which in turn, is returned to the MTC device via Public Transport Address Reply procedure. MTC device can now use such public transport address information to initiate communications with the peer entity.

For Option 2, the Public Transport Address Request/Reply procedure (1201, 1206) is performed with the help of the MTC Gateway/Proxy 420. When the MTC device 412 wants to initiate communications with a peer entity, and if it does not already have its (public) transport address information, depending on the application at the MTC device 412, the MTC device 412 selects a 'port' from which it wants to initiate communications with the peer entity. It then initiates Public Transport Address Request/Reply procedure (1201, 1206) by sending the Request message directed to the MTC Gateway/Proxy. The Request message 1201 includes information such as the Device ID, the private IPv4 Address (assigned to the MTC device) and the 'port' information (chosen by the MTC device 412). It is assumed that the MTC Gateway/Proxy 420 has information about the serving GGSN/P-GW 414 and possibly the private IPv4 addressed to the MTC device 412. It is possible that the Request message 1201 may not include the private IPv4 address assigned to the MTC device 412. Alternatively, such information (serving GGSN/P-GW and the IPv4 Address if not included in the Request message), can be obtained by the MTC Gateway/Proxy 420 by querying (1202) the HSS/HLR 418 based in the Device ID (and receiving a response 1203). The MTC Gateway/Proxy 420 then initiates Translate Address Request/Reply procedure (1204, 1205) by passing the assigned private transport address (IPv4 Address and the Port) information to the GGSN/P-GW 414 which in turn performs such procedure with the Address Determination Server 424. The Address Determination Server 424 performs address translation and returns the mapped public transport address (IP Address+Port) information to the GGSN/P-GW 414 (1205). Such information, in turn, is passed to MTC Gateway/Proxy and returned to the MTC device via Public Transport Address Reply procedure (1206). MTC device can now use such public transport address information to initiate communications with the peer entity.

4. Exemplary Implementations in 3GPP Networks

In the description below, the MTC device 502, GGSN 506, NAT server 508, HSS/HLR 510, and MTC server 514 may be substantially similar to previously discussed MTC device 412, GGSN 414, NAT server 424, HSS/HLR 418, and MTC server 422 respectively. Furthermore, additional network elements—mobility management entity (504), MTC-IWF 512 are described below.

In general, when supporting MTC for UEs residing behind a NAT, there are no additional requirements on the UEs. Similarly, when supporting MTC for UEs residing behind a NAT, there are no additional requirements on the MTC Server.

When supporting MTC for UEs residing behind a NAT, the MTC InterWorking Function (MTC-IWF) may include one or more of the following functionalities:

The MTC-IWF may be able to recognize that the UE used for MTC is behind a NAT device.

The ability to recognize that the UE is being served by a GGSN/P-GW that is located behind a NAT based on the IPv4 address assigned to the UE used for MTC.

The ability to initiate procedures to obtain the public transport address (IP address+port) for the UE used for MTC by querying the GGSN/P-GW.

The ability to communicate the public transport address for the UE for MTC to the MTC Server.

When supporting MTC for UEs residing behind a NAT, the GGSN/P-GW may invoke STUN/TURN protocol mechanisms with the NATs for private to public transport address translations. The GGSN/P-GW may perform the following functions:

Support STUN/TURN functionality as specified in RFC5239 and RC5766.

Support STUN/TURN server discovery. In some implementations, a configuration mechanism can be used to provision STUN/TURN server addresses in the GGSN/P-GW.

When requested by the MTC-IWF, initiate procedures to obtain the public transport address for the UE used for MTC by performing STUN/TURN address determination procedure with the NAT.

Communicate the translated transport address assigned to the UE for MTC to the MTC-IWF.

Maintain NAT bindings by the use of STUN keep-alive mechanisms.

The STUN server and associated signaling requirements are documented in RFC5389. When supporting MTC for UEs that are residing behind a NAT, no additional requirements are placed on the STUN server. In some implementations, no STUN server may be deployed in the network. In some implementations, a STUN server may be deployed, thereby facilitating the discovery of the APN-facing transport address at the NAT for the UEs for the majority of NAT types. In one aspect, this may minimize the need for TURN resources by allowing UEs to directly communicate user plan traffic through the NAT.

The TURN relay and associated signaling requirements are documented in RFC 5766. When supporting MTC for the UEs that are residing behind a NAT, no additional requirements are placed on TURN relay server. In some implementations, no TURN may be deployed in the network. In some implementations, TURN may be deployed to facilitate the exchange of user plane traffic in the presence of all types of NATs.

The MTCyy reference point is between the GGSN/P-GW and the STUN/TURN Address Determination Function. This interface conveys the information necessary for the NAT device to activate the procedures in the GGSN/P-GW and in the STUN/TURN Address Determination Server.

5. Procedures for performing address determination

The procedures described in this clause are specific to the use of non-Managed NATs, and are applied in addition to other procedures for the support of Machine Type Communications.

5.1 NAT detection in MTC-IWF

When the PLMN supports non-managed NATs, based on the IPv4 address assigned to the UE used for MTC or based on local configurations, the MTC-IWF shall detect if a NAT is deployed between the GGSN/P-GW and the APN, and decide if address translation functions shall be invoked with the GGSN/P-GW.

5.2 Session Establishment Procedure

Figure 5:
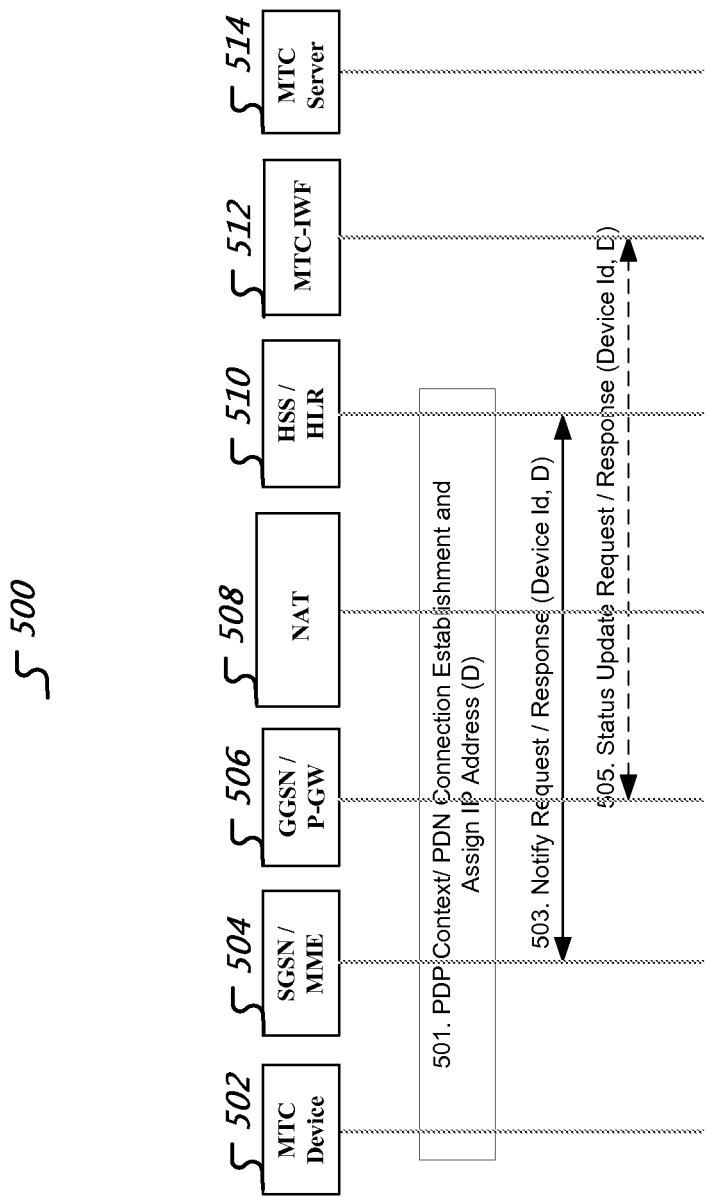
FIG. 5 is a signal exchange diagram for a session establishment procedure.

With reference to FIG. 5, the session establishment procedure 500 is applied when the UE used for MTC registers with the network and establishes PDP context/PDN connection (501). Such procedures may be invoked by the UE initiating the procedures autonomously or as a result of being Paged by the network.

The MTC device performs Attach procedure with the network, either autonomously or as a result of being Paged by the network. As part of the Attach procedure the MTC device is assigned an IPv4 address, referred to here as 'D' (message 503). As the MTC device is deployed behind a NAT, the assigned IPv4 address is in the private address domain of the GGSN/P-GW. The Create Session Response message (not shown) is used to convey the address 'D' from the GGSN/P-GW to SGSN/MME. An MTC-IWF is also assigned for the MTC device.

As part of the previous step, or at the end of the Attach procedure, the SGSN/MME notifies the HSS/HLR of the address 'D' assigned to the MTC device. If an interface is defined between the GGSN/P-GW and the MTC-IWF, a Status Update Request/Response message 505 can be used to by the GGSN/P-GW to notify the MTC-IWF of the address 'D' assigned to the MTC device.

5.3 UE initiated communications

Figure 6:
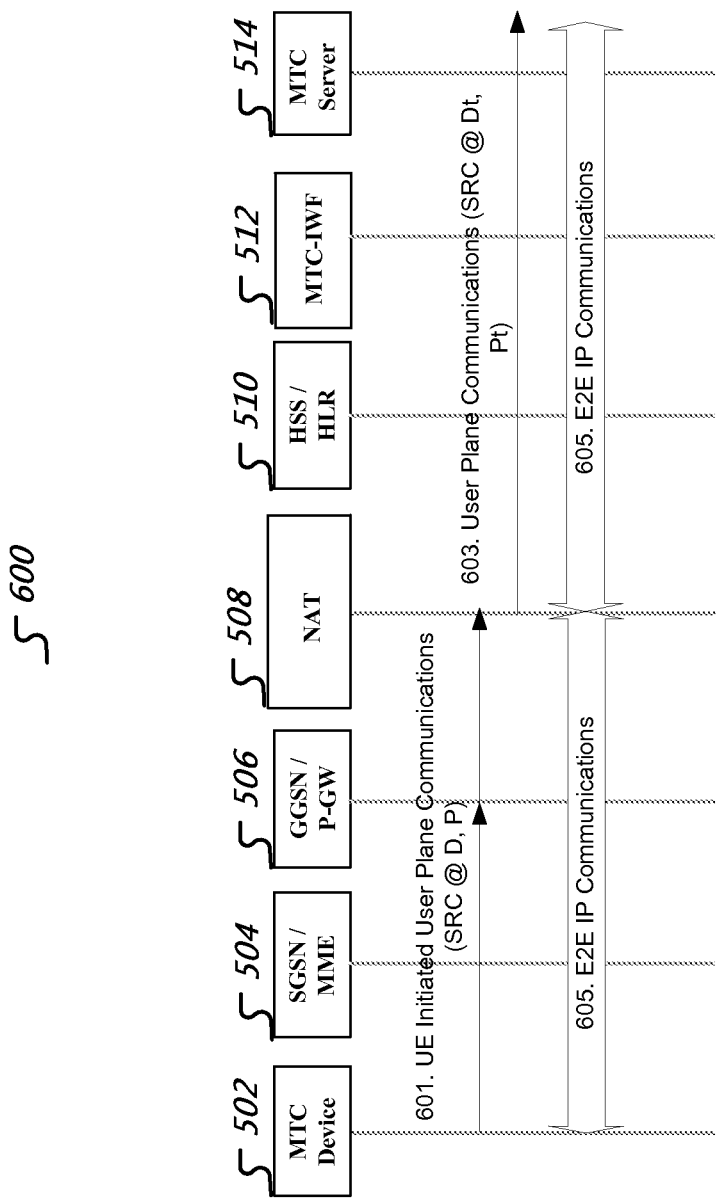
FIG. 6 is a signal exchange diagram showing a UE initiated communications

With reference to FIG. 6, the procedure 600 is applied when the UE used for MTC has registered with the network and has a PDN context/PDP connection established and an IPv4 address assigned, as described above. Since the UE used for MTC is behind a NAT, a private IPv4 address 'D' is assigned to the UE.

The MTC device 502 sends a user plane packet addressed to the peer-entity over the established PDN context/PDP connection (601). The source IP address of the packet is set to the private IPv4 address 'D' assigned to the MTC device.

On receiving the user plane packet for which there is no binding, the NAT device recognizes it as packet flow for a new session. The NAT device performs address and/or port translation on the private address/port (D, P) and replaces the source transport address of the user plane packet with the translated transport address (Dt, Pt), shown in message 603.

End-to-end IP communication 605 between the MTC device and the peer entity continues. The peer entity uses transport address (Dt, Pt) as the destination address in the user plane packets sent to the MTC device. NOTE: The NAT bindings are kept alive by virtue of the flow of user plane traffic. In case the NAT reboots and/or the old bindings are lost, new bindings are created on the receipt of user plane packet from the UE.

5.4 MTC Server Triggered Communications

Figure 8:
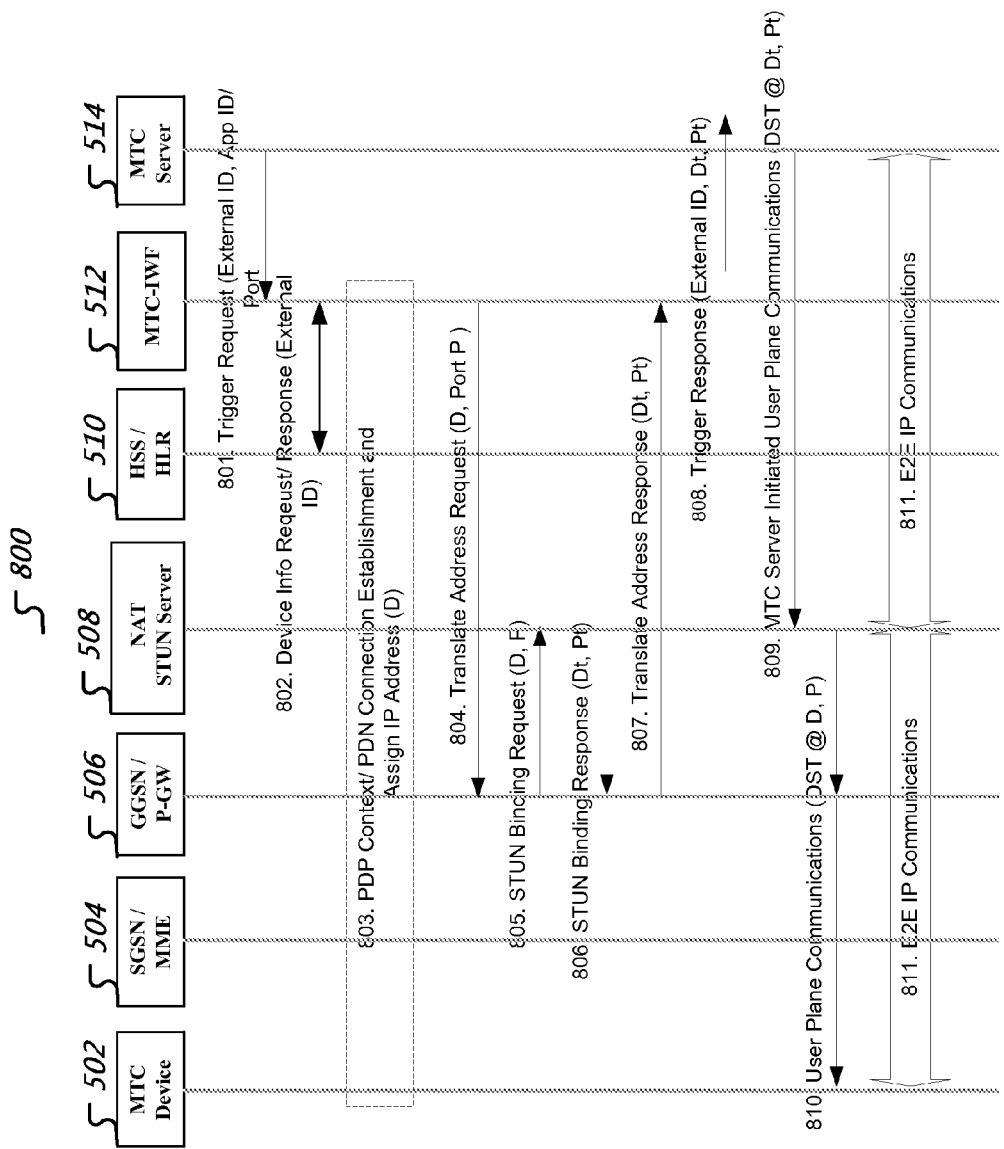
FIG. 8 depicts a signal exchange diagram of messages exchanged in an MTC server triggered communication.

The procedure 800 depicted in FIG. 8 is applied when the MTC Server wants to initiate communications with the UE used for MTC. The MTC Server determines the MTC-IWF that serves the UE used for MTC by performing DNS query with UE's External ID. As the MTC-IWF assigned for a particular UE used for MTC will change rarely, the MTC Server will need to perform DNS query to resolve the assigned MTC-IWF address rarely. This address is then used to request the MTC-IWF for the routable IP address to use for initiating user plane communications with the UE. DNS update and DNS query procedures for resolving MTC-IWF address are not shown in the following illustration.

In the following illustration the STUN Server element represents both a STUN server and TURN relay as a single logical element. It would be equally valid if these functions we represented as separate logical elements. The procedures are unaffected by the grouping. Further, this call flow represents a simplified view to illustrate the NAT traversal procedures for STUN server only.

The MTC Server wants to initiate communications with an MTC device and if it does not have the IP address information for the MTC device or identifies a need to recover IP connectivity e.g., the MTC device is not responding anymore, the MTC Server queries the MTC-IWF for the IP address by sending a Trigger Request message 801. The Trigger Request message 801 includes the MTC device External Identifier, and Application Identifier for the application that the MTC Server wants to initiate with the MTC device.

The Application Identifier information can be in the form of an "Application ID" that is commonly understood by the service provider and the PLMN entities. Else, it could be in the form of a "port number" assigned to the application by the International Authority for Name Assignment (IANA) or some such other accredited organization.

In some implementations, the MTC server may determine the MTC-IWF that serves the UE used for MTC by performing a DNS query using the UE's external ID.

The MTC-IWF authorizes the trigger request, communicates (message 802) with the HSS/HLR to obtain the IP address assigned to the MTC device, if such information is not available in the local cache. If there is an active PDP context/PDN connection for the MTC device, the HSS/HLR returns the private IPv4 address and the GGSN/P-GW assigned to the MTC device, and the procedures continue below. Else, if the PDP context/PDN connection is not established (as in 803) or the IP connectivity needs to be recovered, the HSS/HLR returns the internal Device ID (IMSI) and any additional information needed for triggering the MTC device as in Step 804.

The MTC-IWF selects the device trigger delivery mechanism and forwards trigger request to the next node involved in the delivery of the trigger to the MTC device. Resulting from triggering the MTC device, a PDP context/PDN connection is established (803) and an IPv4 address assigned to the MTC device as per procedures in this document. At this stage, the IP address 'D' assigned to the MTC device is available at the HSS/HLR and/or at the MTC-IWF, which along with the assigned GGSN/P-GW information is made available to the MTC-IWF. As the MTC device is located behind the NAT, the MTC-IWF initiates address translation procedures by sending Translate Address Request message 804 that includes the (private) IPv4 address 'D' and Application ID/Port 'P' information to the assigned GGSN/P-GW.

The GGSN/P-GW implements STUN/TURN client function as specified in RFC5389 and RFC5766 respectively. The GGSN/P-GW sends STUN Binding Request message 805 to the STUN/TURN server to obtain the public transport address for the MTC device.

The STUN/TURN server performs address translation and returns the mapped public transport address information to the GGSN/P-GW in STUN Binding Response message 8-6. The STUN/TURN server maintains binding for the translated address for the duration of the binding 'lifetime' as per procedures in RFC5389.

The GGSN/P-GW intercepts STUN Binding Response message, and returns the translated transport address information to the MTC-IWF via Translate Address Response message 807.

The MTC-IWF returns the public transport address assigned to the MTC device to the MTC Server via Trigger Response message 808.

At this stage the MTC Server is ready to initiate communications with the MTC device. The MTC Server sends user plane packets 809 addressed to the MTC device with the target address set to the public transport address (Dt, Pt) assigned to the MTC device.

On receiving the user plane packets, the NAT recognizes the binding for the public transport address (Dt, Pt) and replaces the destination transport address information with the private address (D, P) assigned to the MTC device 810.

End-to-end IP communications 811 between the MTC Server and the MTC device continues. The MTC device uses the private address/port information (D, P) as the source address for the user plane packets, which is mapped to the public transport address (Dt, Pt) by the NAT device.

5.5 Maintaining STUN Bindings

Figure 9:
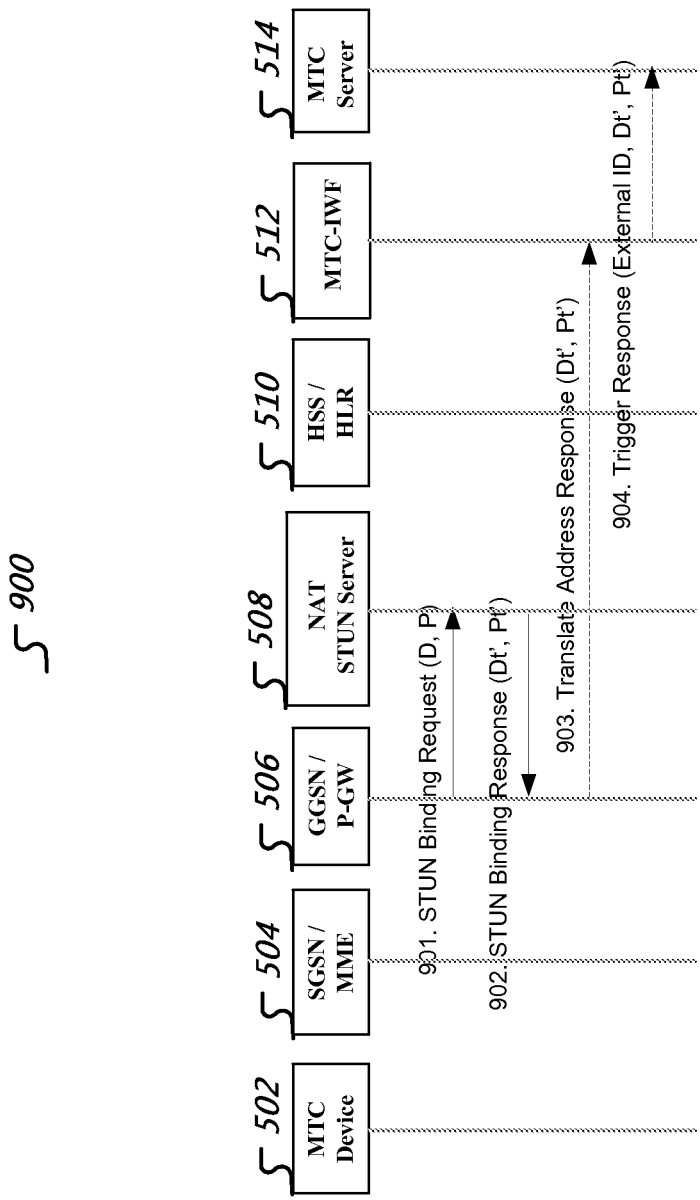
FIG. 9 shows messages exchanged during the operation of maintaining STUN bindings.

With reference to FIG. 9, the procedure 900 is applied for maintaining STUN bindings at the NAT device. NAT bindings are kept alive by virtue of the flow of user plane traffic. Additionally, the STUN client function at the GGSN/P-GW keeps the bindings alive by the use of STUN keep-alive signaling.

NAT bindings are kept alive by virtue of the flow of user plane traffic. Additionally, the STUN client function in the GGSN/P-GW keeps the bindings alive by sending periodic keep-alive STUN Binding Request message 901 to the STUN server.

The STUN server updates the lifetime of the binding and returns STUN Binding Response message 902 to the GGSN/P-GW. Binding Response message includes the mapped transport address (Dt, Pt) also. Inclusion of such information allows the GGSN/P-GW to determine if the NAT has rebooted and assigned new bindings (Dt', Pt') for the MTC device.

If NAT assigns new bindings, the GGSN/P-GW forwards such information to the MTC-IWF via Translate Address Response (Dt', Pt') message 903.

MTC-IWF forwards the new transport address information to the MTC Server. The MTC Server uses the new transport address (Dt', Pt') for further communications with the MTC device 904.

5.6 Releasing NAT Bindings

Figure 10:
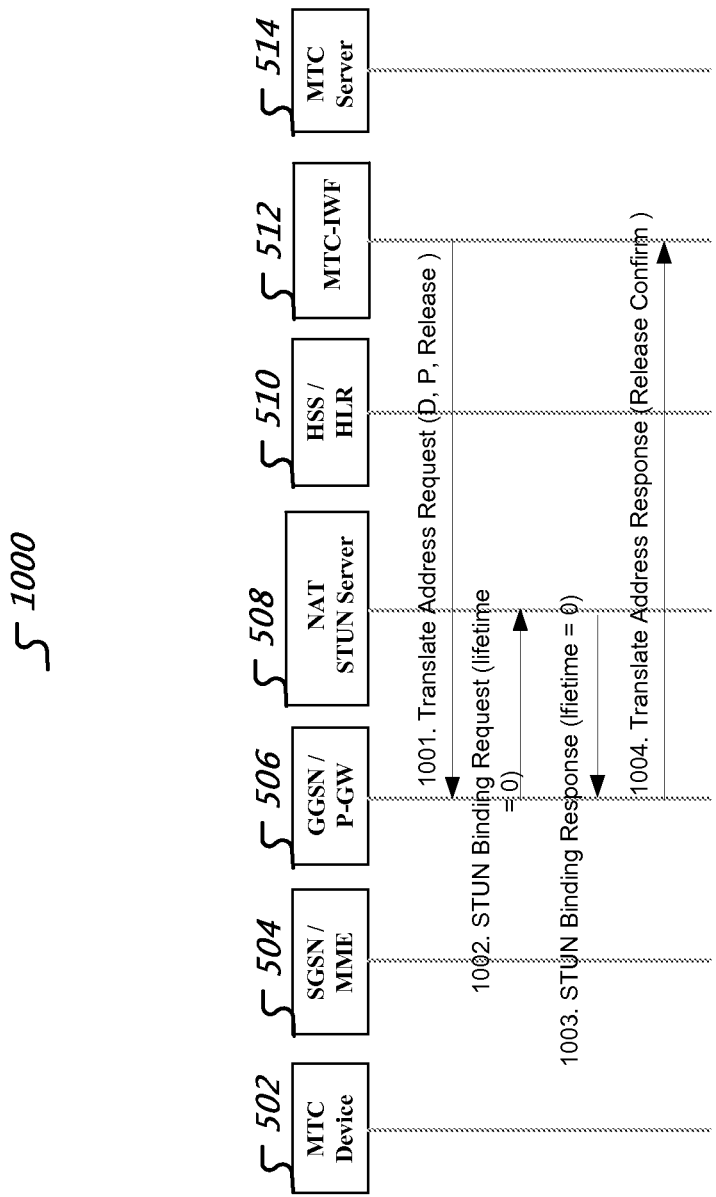
FIG. 10 shows messages exchanged during the operation of releasing NAT bindings.

With reference to FIG. 10, the procedure 1000 is applied for releasing STUN bindings at the NAT device. When the MTC-IWF learns about the release of the private IPv4 address 'D' assigned to the UE used for MTC, MTC-IWF initiates NAT binding release procedure by sending Translate Address Request (Release) message 1001 to the GGSN/P-GW. The MTC-IWF learns about the release of the IP address when the PDP context/PDN connection for the UE used for MTC is released or by some other means.

The MTC-IWF learns about the release of the IP address 'D' assigned to the MTC device. MTC-IWF initiates NAT binding release procedure by sending Translate Address Request (Release) message 1101 to the GGSN/P-GW.

The GGSN/P-GW sends STUN Binding Request (D, P) message to the STUN server, with binding lifetime set to '0' 1002.

The STUN server releases the binding for the MTC device and responds with STUN Binding Response message with lifetime set to '0' 1003.

The GGSN/P-GW confirms the release of the NAT binding by returning Translate Address Response (Release Confirm) message to the MTC-IWF 1004.

Figure 13:
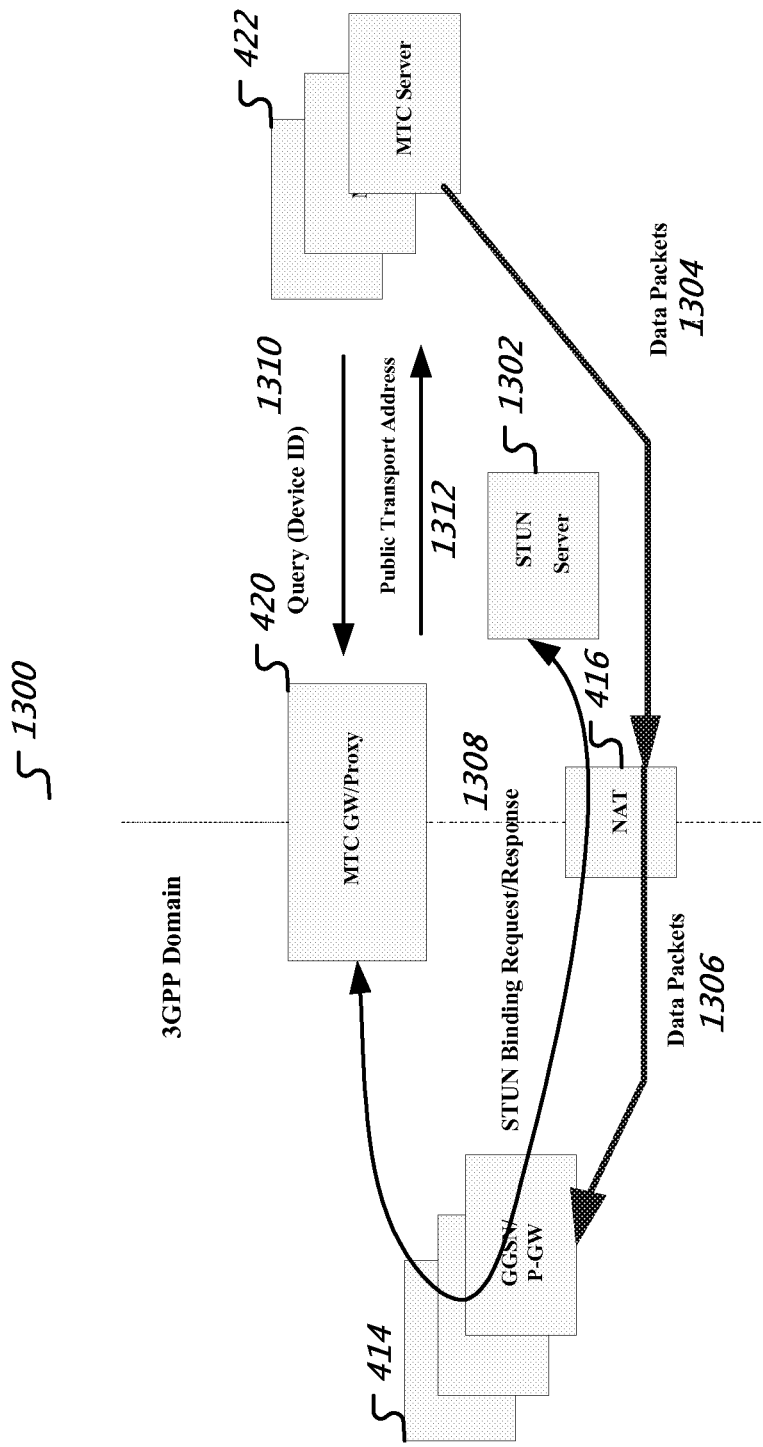
FIG. 13 shows example address mapping and data transport with a STUN server.
Figure 14:
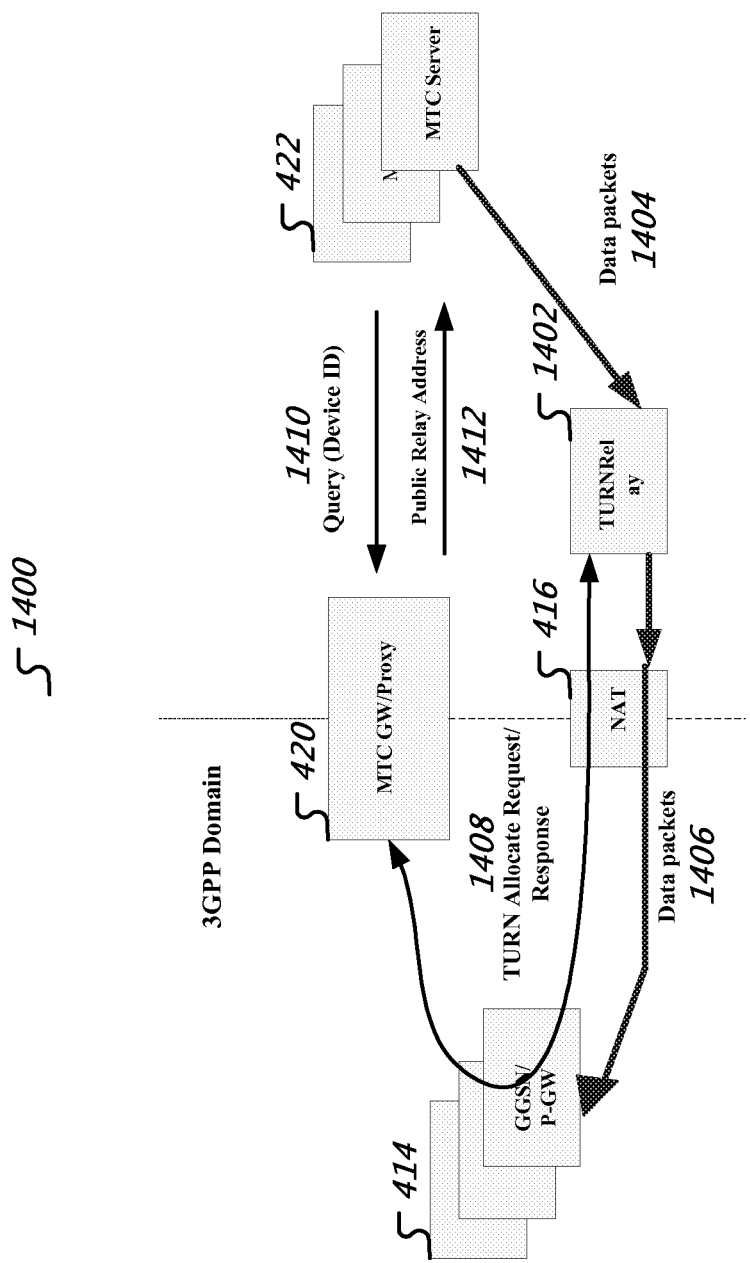
FIG. 14 shows example address mapping and data transport with a TURN relay.

FIG. 13 shows an exemplary process 1300 for Address Mapping and Data Transport with STUN Server 1302. Some NAT equipment behaves as 'Endpoint-Independent mapping and filtering' (EIM). They use the same public port mapping for all packets sent from the same (source) IP address and port of the MTC device (behind the NAT) irrespective of the destination IP transport address of the MTC server. Additionally, such NATs do not filter incoming packets with source transport address different from that of the destination in the previous outgoing packets. In this case, an Address Server (STUN Server 1302) can be deployed for address determination procedures and to obtain the mapped public transport address for the MTC device.

When the MTC server 422 wants to initiate communications with an MTC device 414, if it already does not have the (public) transport address information for the MTC device, the MTC server queries the transport address of the MTC device by sending a Query message 1310 to the MTC Gateway/Proxy 420. The Query message 1310 includes the MTC Device ID. MTC Gateway/Proxy queries the HSS/HLR for the serving GGSN/P-GW location information and the private IPv4 address assigned to the MTC device, or obtains such information from its local cache if so available. On the receipt of the private IPv4 address assigned to the MTC device, the MTC Gateway/Proxy initiates Translate Address Request/Reply procedure with the GGSN/PGW by passing the assigned private IPv4 Address and pseudo Port information to the GGSN/PGW. The 'port' chosen for the Translate Address Request procedure can be a dynamic/private (ephemeral port) in the range of 48 k to 64 k or some other port that is FFS. Alternatively, instead of the MTC Gateway/Proxy choosing the pseudo Port, such port could be chosen by the GGSN/P-GW. The GGSN/P-GW performs STUN Binding Request/Response (1308) procedure (RFC5389—Session Traversal Utilities for NAT) with the STUN Server (Address Determination Server), which performs address translation and returns the mapped public transport address (public IP Address+Port) information to the GGSN/P-GW in XOR-Mapped-Address attribute. Such information, in turn, is passed (1312) to the MTC Gateway/Proxy and to the MTC server. MTC server can now use such public transport address of the MTC device to initiate communications. The MTC device may be online or offline to receive such communications from the MTC server.

The GGSN/P-GW may use DNS Discovery procedures to determine the STUN Server, or STUN Server address information could be configured at the GGSN/P-GW. STUN message exchange between the GGSN/P-GW (STUN client) and the STUN Server can be protected by the Authentication and Message Integrity Mechanisms specified for STUN protocol (RFC5389). STUN Binding Indications can be used for keep-alive procedures to maintain address translations at the NAT entities. Default settings of the lifetime information for address translations at the NAT, and keep-alive procedures are FFS. The MTC server 422 may then perform data packet communication 1304 via the NAT (translated addresses as data packets 1306).

Scenario-2:

FIG. 10 shows an exemplary process for Address Mapping and Data Transport with TURN Relay 1402. If NAT behaviour is 'Endpoint-Dependent' NAT ('non-EIM'), then it may behave as Address-Dependent or Address-and-Port-Dependent NAT. For such NATs, performing address resolution with a STUN Server whose address could be different from the address of the MTC server will not be a workable solution. Such NATs (non-EIM) may filter downlink packets that are not sent from the same transport address as that of the transport address of the STUN Server used for address mapping purpose. In this case, a Relay Server (TURN Relay) can be deployed to obtain the relay transport address for the MTC device.

When the MTC server wants to initiate communications with an MTC device, if it already does not have the (public) transport address information for the MTC device, the MTC server queries the transport address of the MTC device by sending a Query message 1410 to the MTC Gateway/Proxy. The Query message includes the MTC device ID. MTC Gateway/Proxy queries the HSS/HLR for the serving GGSN/P-GW location information and the private IPv4 address assigned to the MTC device, or obtains such information from its local cache if so available. On the receipt of the private IPv4 address assigned to the MTC device, the MTC Gateway/Proxy initiates Translate Address Request/Reply procedure with the GGSN/PGW by passing the assigned private IPv4 Address and pseudo Port information to the GGSN/PGW. The 'port' chosen for the Translate Address Request procedure can be a dynamic/private (ephemeral port) in the range of 48 k to 64 k or some other port that is FFS. Alternatively, instead of the MTC Gateway/Proxy choosing the pseudo Port, such port could be chosen by the GGSN/P-GW. Knowing that the NAT behaves as a non-EIM NAT, the GGSN/P-GW performs TURN Allocate Request/Response procedure 1408 (RFC5766—Traversal Using Relays Around NAT) with the TURN Relay (Address Determination Server), which returns the relay transport address (public IP Address+Port) to the GGSN/P-GW in XOR-Relayed-Address Attribute. Such information, in turn, is passed to the MTC Gateway/Proxy and to the MTC server (1412). The GGSN/P-GW (TURN client) performs Create-Permission and/or ChannelBind procedure(s) with the TURN Relay to enable communications with the MTC server. MTC server can now use such TURN relay transport address to initiate communications with the MTC device. The MTC device may be online or offline to receive such communications from the MTC server.

The GGSN/P-GW may use DNS Discovery procedures to determine the serving TURN Relay or TURN Relay address information can be configured at the GGSN/P-GW. TURN message exchanges between the GGSN/P-GW (TURN client) and the TURN Relay can be protected by the Authentication and Message Integrity Mechanisms specified for TURN protocol (RFC5766). Binding Indications can be used for keep-alive procedures to maintain address translations at the NAT entities. Default settings of the lifetime information for address translations at the NAT, TURN relay address mappings lifetime and keep-alive procedures are FFS. Details of the CreatePermission and ChannelBind methods are also FFS.

The MTC server 422 may then perform data packet communication 1404 via the NAT (translated addresses as data packets 1406).

FIG. 15 is a flow chart representation of a process 1500 implementable at a network-side in a wireless communication network. The process 1500 may be implemented, e.g., on the platform on which the previously discussed MTC-IWF is implemented. At 1502, a trigger request including an external identification (ID) of a machine type communication (MTC) device is received. At 1504, a device information request that includes the external ID is transmitted. At 1506, in response to the device information request, a first IP address is received for the MTC device. The first IP address may be in a private address space of the wireless network. At 1508, a second IP address is obtained based on the first IP address. The second IP address corresponds to a translation of the first IP address in a second network from which the trigger request was received. In some implementations, the second IP address may be obtained by transmitting an address translation request including the first IP address and receiving the second IP address in response. In some implementations, the trigger request is responded to by providing a response message that includes the second IP address. In some implementations, the second IP address may correspond to the public space. The process 1500 may be applicable to IPv4 addresses.

FIG. 16 is a block diagram representation of an apparatus 1600 for facilitating wireless communications. The module 1602 (e.g., a trigger request receiver) is for receiving a trigger request including an external identification (ID) of a machine type communication (MTC) device. The module 1604 (e.g., a request transmitter) is for transmitting a device information request including the external ID. The module 1606 (e.g., an IP address receiver) is for receiving, in response to the device information request, a first IP address for the MTC device, the first IP address being in a private address space of the wireless network. The module 1608 (e.g., an IP address obtainer) is for obtaining a second IP address based on the first IP address, the second IP address corresponding to a translation of the first IP address in a second network from which the trigger request was received. The apparatus 1600 and modules 1602, 1604, 1606, 1608 may be configured to further perform one or more techniques disclosed in this document.

Figures 17, 18:
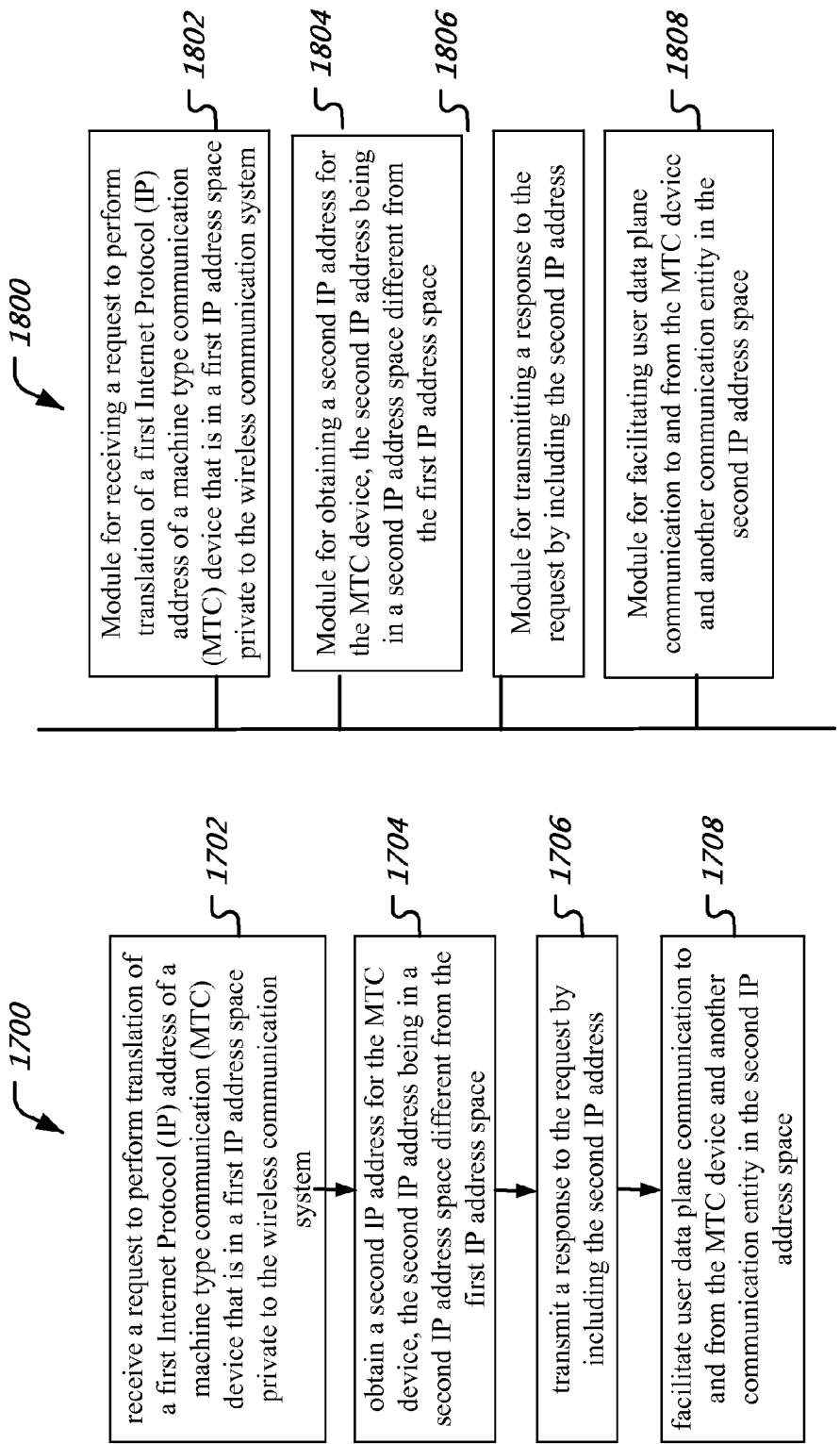
FIG. 17 is a flow chart representation of a process implementable at a gateway device in a wireless communication system.
FIG. 18 is a block diagram representation of a portion of a gateway device operable in a wireless communications network.

FIG. 17 is a flow chart representation of a process 1700 implementable at a gateway device in a wireless communication system. At 1702, a request is received to perform translation of a first Internet Protocol (IP) address of a machine type communication (MTC) device that is in a first IP address space private to the wireless communication system. At 1704, a second IP address is obtained for the MTC device, the second IP address being in a second IP address space different from the first IP address space. At 1706, a response is transmitted to the request by including the second IP address. At 1708, user data plane communication to and from the MTC device and another communication entity in the second IP address space is facilitated.

FIG. 18 is a block diagram representation of a portion of a gateway device 1800 operable in a wireless communications network. The module 1802 (e.g. a request receiver) is for receiving a request to perform translation of a first Internet Protocol (IP) address of a machine type communication (MTC) device that is in a first IP address space private to the wireless communication system. The module 1804 (e.g., an IP address obtainer) is for obtaining a second IP address for the MTC device, the second IP address being in a second IP address space different from the first IP address space. The module 1806 (e.g., a response transmitter) is for transmitting a response to the request by including the second IP address. The module 1808 (e.g., a gateway server) is for facilitating user data plane communication to and from the MTC device and another communication entity in the second IP address space. The apparatus 1800 and modules 1802, 1804, 1806, 1808 may further be configured to implement one or more techniques disclosed in this document.

It will be appreciated that techniques for identifying IP address of a machine type communication (MTC) device located behind an NAT are disclosed. MTC devices often are located in a wireless network in which a private IPv4 address is often allocated to the MTC device. Because of limitations in the range of address available using IPv4 protocol, the private address may be in an address range different from a range in which an MTC server's IP address may be. Therefore, the MTC server may not be directly able to communicate with the MTC device and may need address translation services. However, because the MTC device typically operates by entering long sleep modes, the private IPv4 address of the MTC device may not be available to the MTC server when the MTC server wants to communicate with the MTC device.

It will be appreciated that the disclosed signal exchange technique, in one aspect, allow an MTC device to discover its own public IP address (i.e., the IP address by which the MTC device is known to an MTC server). In one aspect, this knowledge may be useful for the MTC device to be able to establish secure communication or request and receive digital certificates that include information about the public IP address of the MTC device.

It will further be appreciated that the disclosed processes, apparatus and system, in one aspect, facilitate rapid communication between an external device (e.g., an MTC server) and the MTC device, regardless of whether the MTC device is in an active state with an already assigned IP address, in a mode in which the MTC device has its RF turned off but still has an IP address assigned or in a mode in which the MTC device has its RF turned off and no IP address is currently assigned to the MTC device (Active, Dormant and Inactive states). Using the signal exchanges disclosed in the present document, a practical system may be able to establish communication with the MTC device within a short period of time of the order of a few (e.g., 2 to 10) milliseconds, regardless of the operational mode of the MTC device when a trigger request is received for establishing communication with the MTC device.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method, implementable at a network-side in a wireless communication network, comprising:
   receiving a trigger request including an external identification (ID) of a machine type communication (MTC) device;
   transmitting a device information request including the external ID;
   receiving, in response to the device information request, a first internet protocol (IP) address for the MTC device, the first IP address being in a private address space of the wireless network; and
   obtaining a second IP address based on the first IP address, the second IP address corresponding to a translation of the first IP address in a second network from which the trigger request was received.

2. The method of claim 1, wherein the obtaining the second IP address includes:
   transmitting an address translation request including the first IP address; and
   receiving the second IP address in an address translation response message.

3. The method of claim 1, further comprising:
   responding to the trigger request by providing a trigger response message including the second IP address.

4. The method of claim 1, wherein the first IP address and the second IP address comprise IP version 4 (IPv4) addresses.

5. The method of claim 1, wherein the trigger request is received when the MTC device does not have any IP address assigned.

6. An apparatus, operable at a network-side in a wireless communication network, comprising:
   a trigger request receiver that receives a trigger request including an external identification (ID) of a machine type communication (MTC) device;
   a request transmitter that transmits a device information request including the external ID;
   an internet protocol (IP) address receiver that receives, in response to the device information request, a first IP address for the MTC device, the first IP address being in a private address space of the wireless network; and
   an IP address obtainer that obtains a second IP address based on the first IP address, the second IP address corresponding to a translation of the first IP address in a second network from which the trigger request was received.

7. The apparatus of claim 6, wherein the IP address obtainer includes:
   a translation request transmitter that transmits an address translation request including the first IP address; and
   another IP address receiver that receives the second IP address in an address translation response message.

8. The apparatus of claim 6, further comprising:
   a trigger request responder that responds to the trigger request by providing a trigger response message including the second IP address.

9. The apparatus of claim 6, wherein the first IP address and the second IP address comprise IP version 4 (IPv4) addresses.

10. The apparatus of claim 6, wherein the trigger request is received when the MTC device does not have any IP address assigned.

11. A computer program product comprising a non-transitory computer-readable medium having code stored thereupon, the code, when executed on a processor, causing the processor to implement a method, comprising:
   receiving a trigger request including an external identification (ID) of a machine type communication (MTC) device;
   transmitting a device information request including the external ID;
   receiving, in response to the device information request, a first internet protocol (IP) address for the MTC device, the first IP address being in a private address space of the wireless network; and
   obtaining a second IP address based on the first IP address, the second IP address corresponding to a translation of the first IP address in a second network from which the trigger request was received.

12. The computer program product of claim 11, wherein the obtaining the second IP address includes:
   transmitting an address translation request including the first IP address; and
   receiving the second IP address in an address translation response message.

13. The computer program product of claim 11, wherein the method further comprises:
   responding to the trigger request by providing a trigger response message including the second IP address.

14. The computer program product of claim 11, wherein the first IP address and the second IP address comprise IP version 4 (IPv4) addresses.

15. The computer program product of claim 11, wherein the trigger request is received when the MTC device does not have any IP address assigned.

16. An apparatus, operable at a network side in a wireless communications network, comprising:
   means for receiving a trigger request including an external identification (ID) of a machine type communication (MTC) device;
   means for transmitting a device information request including the external ID;
   means for receiving, in response to the device information request, a first internet protocol (IP) address for the MTC device, the first IP address being in a private address space of the wireless network; and
   means for obtaining a second IP address based on the first IP address, the second IP address corresponding to a translation of the first IP address in a second network from which the trigger request was received.

17. The apparatus of claim 16, wherein the means for obtaining the second IP address includes:
   means for transmitting an address translation request including the first IP address; and
   means for receiving the second IP address in an address translation response message.

18. The apparatus of claim 16, further comprising:
   means for responding to the trigger request by providing a trigger response message including the second IP address.

19. The apparatus of claim 16, wherein the first IP address and the second IP address comprise IP version 4 (IPv4) addresses.

20. The apparatus of claim 16, wherein the trigger request is received when the MTC device does not have any IP address assigned.

21. A wireless communications system, comprising:
   a machine type communication interworking function (MTC-IWF) that:

receives a trigger request including an external identification (ID) of a machine type communication (MTC) device;

transmits a device information request including the external ID;

receives, in response to the device information request, a first internet protocol (IP) address for the MTC device, the first IP address being in a private address space of the wireless network; and obtains a second IP address based on the first IP address, the second IP address corresponding to a translation of the first IP address in a second network from which the trigger request was received; and a packet data gateway (P-GW) that:

receives a request to perform translation of the first IP address;

exchanges messages to generate the second IP address for the MTC device;

provides the second IP address to the MTC-IWF; and facilitates user data plane communication to and from the MTC device and another communication entity in the second IP address space.

* * * * *